United States Patent [19]
Garcin et al.

[11] 3,836,398
[45] Sept. 17, 1974

[54] ELECTROCHEMICAL GENERATORS OF THE METAL-AIR OR METAL-OXYGEN TYPE

[75] Inventors: Maurice Garcin, Paris; Adrien Gauthier, Saint-Ouen, both of France

[73] Assignee: Societe Les Piles Wonder, Saint-Ouen, France

[22] Filed: Feb. 23, 1972

[21] Appl. No.: 228,618

[30] Foreign Application Priority Data

Feb. 25, 1971 France .................... 71.06444

[52] U.S. Cl. ............................... 136/86 A, 136/169
[51] Int. Cl. ..................... H01m 29/02, H01m 29/04
[58] Field of Search ....... 136/83, 86 A, 79, 80, 169, 136/170

[56] References Cited
UNITED STATES PATENTS
| | | | |
|---|---|---|---|
| 1,949,953 | 3/1934 | Clark | 136/169 |
| 3,592,693 | 7/1971 | Rosansky | 136/86 A |
| 3,623,914 | 11/1971 | Carson | 136/86 A |
| 3,682,706 | 8/1972 | Yardney et al. | 136/86 A |

*Primary Examiner*—Winston A. Douglas
*Assistant Examiner*—H. A. Feeley
*Attorney, Agent, or Firm*—William D. Stokes

[57] ABSTRACT

The generator comprises in combination a container in which are housed a gaseous double diffusion electrode constituting a first assembly with an obturator which carries and closes said container and an anode-dry electrolyte assembly, removable and replaceable independently of the first assembly. The anode-dry electrolyte assembly is U-shaped and is arranged in the container on both sides of the gaseous double diffusion electrode.

3 Claims, 3 Drawing Figures

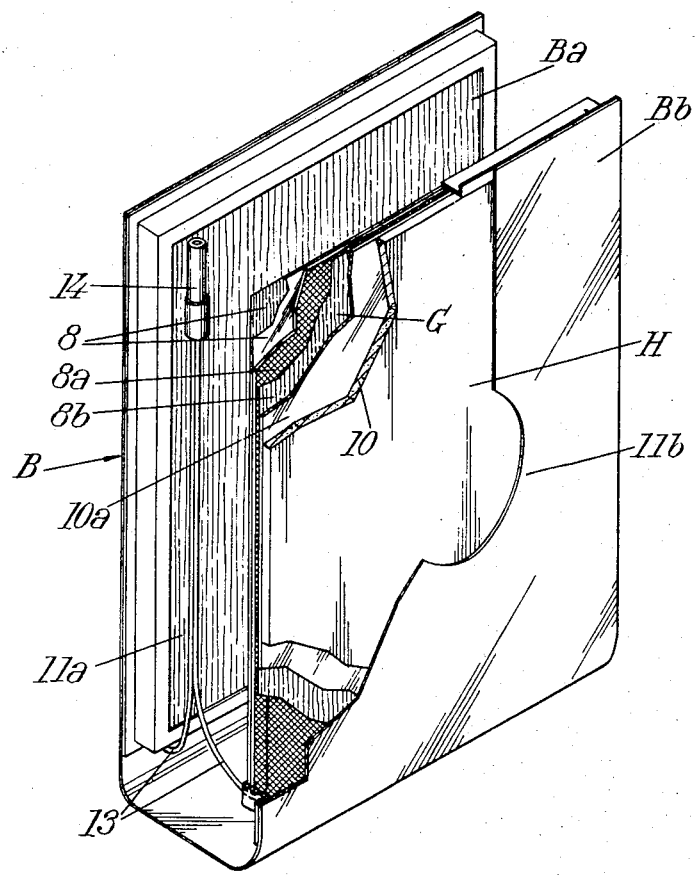

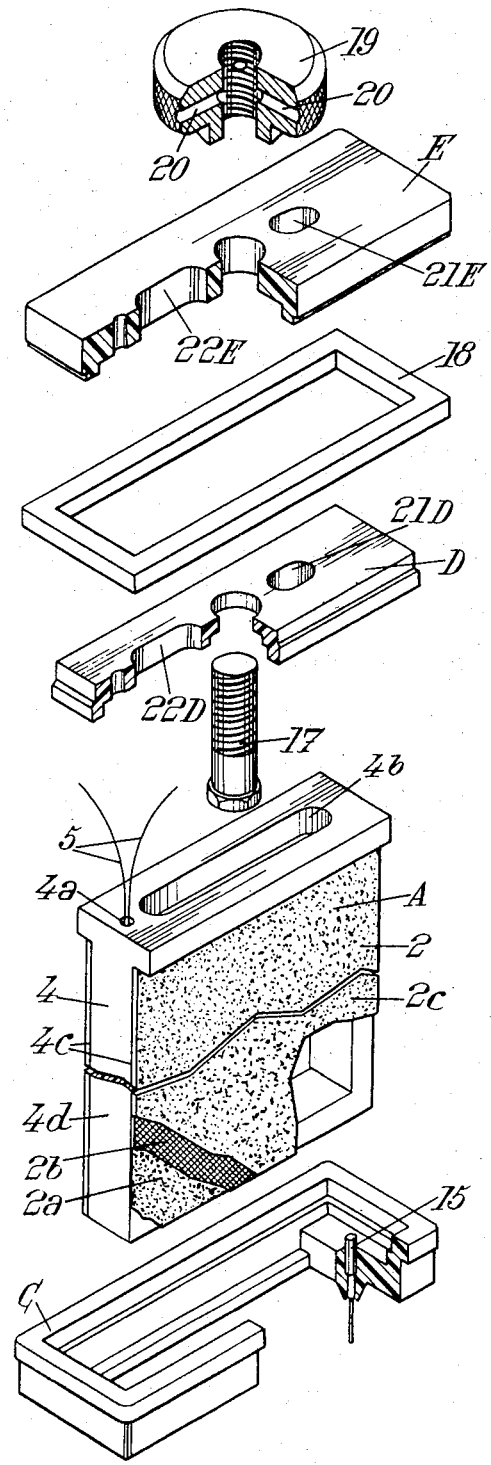

ELECTROCHEMICAL GENERATORS OF THE METAL-AIR OR METAL-OXYGEN TYPE

The invention relates to electrochemical generators comprising one or several metal-air or metal-oxygen cells, in which the anode and the electrolyte of each cell can be replaced each time that this becomes necessary and more particularly when the anode has been used up. Such generators are sometimes called "mechanically rechargeable generators."

The advantage of such recharging is already known, but it may be recalled that this recharging enables a generator to be substantially reconstituted, so that it recovers its full power and its complete autonomy without the introduction of an external source of electric current, as is necessary in the case of accumulators.

It is an object of the invention to provide an electrochemical generator of the metal-air or metal-oxygen type, characterized by the fact that it comprises in combination a container in which are housed, on one hand, a double electrode of the gaseous diffusion type (constituting the cathode) borne by an obturator assembly for closing the said container and, on the other hand, an anode-dry electrolyte assembly.

It is another object to enable convenient disassembly of all the components, including the cathode, and not only to facilitate the replacement of the anode and the electrolyte, but also to provide the possibility of cleaning the active surface of the cathode well on each recharging or even, if necessary, of replacing the whole cathode should it become defective.

A further object is to enable any loss of potash between two cells to be avoided, which provides the advantage of always preserving between the anode and the cathode a certain amount of electrolyte, even when one electrode no longer ensures complete sealing of the electrolyte; a portion of the energy of the cell hence remains available, even in the case of accident.

Yet another object is to enable any direct contact between the anode and the solid electrolyte to be avoided, whilst ensuring a minimum volume for the generator assembly.

By means of the invention, there are obtained after each "recharging" (replacement of used elements), cells which are completely sealed at their upper portions, which permits operation of the generator in any position, provided of course that no external member obstructs the inlets for air or oxygen.

It is possible besides to give the cathode and the anode various shapes which enable the obtaining of better performance as a function of the problem to be solved, and this without spoiling the ease of assembly and of recharging.

The invention enables the provision of a system of electrical connections such that it can be easily reconstituted on each recharging.

The invention will, in any case, be well understood with the aid of the complement of description which follows, as well as of the accompanying drawings, which complement and drawings relate to a preferred embodiment, given purely by way of illustrative but non-limiting example. In the drawings:

FIG. 2 shows, also in perspective with a portion removed, one of the elements, namely the removable anode-electrolyte (dry) assembly of the generator of FIG. 1.

Figure 1:
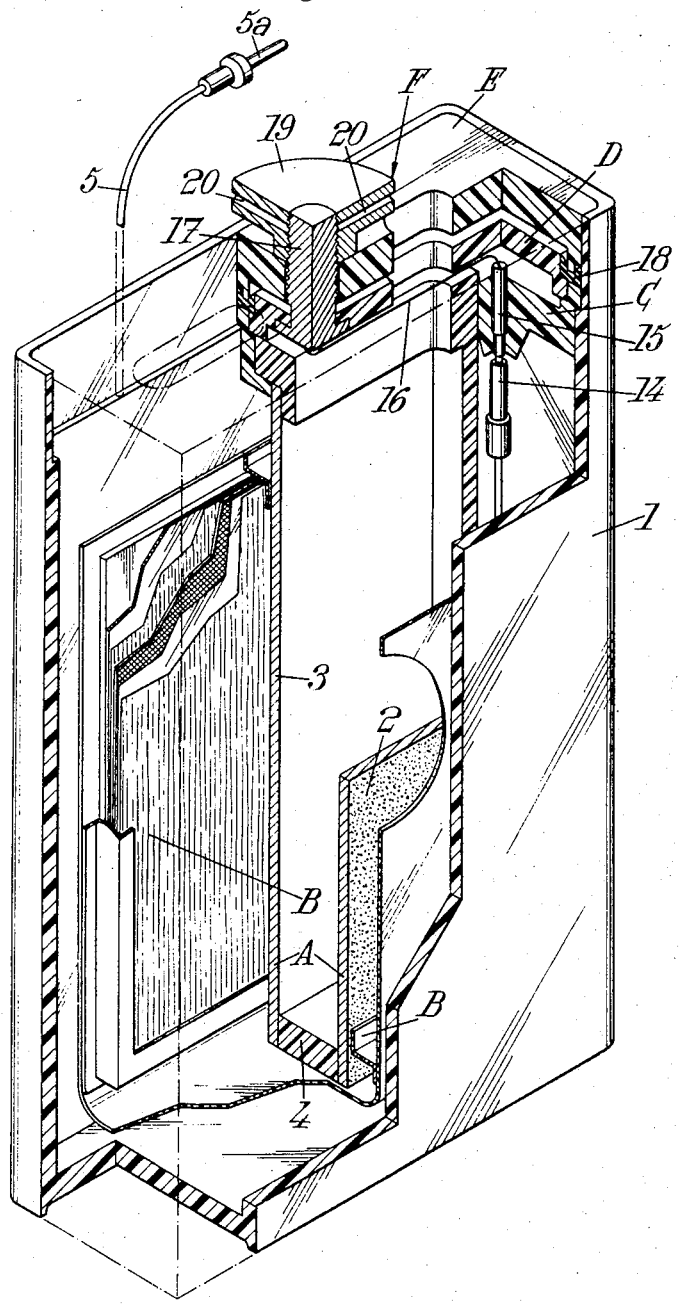
FIG. 1 is a perspective view, with a portion removed, of an electrochemical generator provided with the improvements according to the invention.

FIG. 3, lastly, illustrates in exploded perspective and with a portion removed, certain elements of the generator of FIG. 1.

According to the invention, more especially according to that of its types of application, as well as according to those embodiments of its various parts, to which it would appear preference should be given, in order, for example, to construct an electrochemical generator of the metal-air or metal-oxygen type, also called air-depolarized or oxygen-depolarized generator, procedure is as follows or in an analogous manner.

The electrochemical generator, which can for example be of the metal-air type, comprises firstly (FIG. 1) a container, tank or vat 1 of a material inert with respect to the electrolyte, for example polystyrene. This container 1 is closed at its upper portion by a closure assembly F which will be described in more detail below.

The active portion of the electrochemical generator is constituted by a double electrode A of the gas diffusion type and by a replaceable anode-electrolyte (dry) assembly B (this assembly B being particularly illustrated in FIG. 2). The generator illustrated as a whole in FIG. 1 and constituted (as indicated previously) essentially by the double electrode A and the removable assembly B in the tank 1, has not been put in action and must be completed by the addition of water in order to start up and deliver electrical current.

The double electrode A (FIGS. 1 and 3) is a gaseous diffusion electrode constituted by two electrodes 2 and 3 in sheet form and it is assembled with a part 4 constituting a "aerator." Electrode 2 (and similarly for electrode 3) is advantageously constituted, by way of example, by a porous hydrophobic layer 2a based on polytetrafluorethylene, by a conductive grid 2b of nickel (or of a nickel steel), and by an active layer 2c formed from a mixture of active carbon powder and polytetrafluorethylene. It is of course understood that the composition of electrode 2, which is also that of the electrode 3, is only given by way of example and that there could be provided another composition of gas diffusion sheet electrode.

In its preferred embodiment, the electrochemical generator comprises an aerating pocket obtained by the assembly of two sheet electrodes 2 and 3 against the aerator 4 which has the shape of a frame whose two open lateral surfaces are covered by the sheet electrodes 2 and 3. Preferably the aerator 4 is formed from the same basic constituent as the electrodes 2 and 3, namely polytetrafluorethylene in this particular case, which enables assembly by sintering the edge of the electrodes 2 and 3 against the edges 4c of the aerator 4. The sintering ensures complete adhesion due to which there is formed an aerating pocket capable of resisting the passage of a liquid electrolyte. In a modification, especially when the generator is formed of a different material from the electrodes, the assembly could be effected by gluing or by other suitable means.

At the upper portion of the aerator 4, there are provided two orifices, namely an orifice 4a cylindrical and of small size, through which pass the two current collectors 5 connected to each conductive grid 2b and terminated by a connector 5a, and an elongated orifice 4b, which enables the introduction of air to the electrodes 2 and 3.

In the embodiment illustrated, the two electrodes 2 and 3 are situated in two parallel planes after their assembly on the aerator 4. Of course this parallel arrangement is not absolutely necessary and there could be provided other arrangements by modifying the shape of the aerator 4; for example the two edges 4c of each lateral surface 4d of the aerator 4 in the form of a frame instead of being parallel could separate from one another downwardly so as to gradually increase the distance between the two electrodes 2a and 2b downwardly from above. In this case there would be provided a larger volume of air in the zones distant from the orifices 4a and 4b, which can be advantageous when the generator works in a pulse type regime, with heavy periodic demands for current which pose problems of diffusion of the air from the upper to the lower part of the pocket.

Having completed, especially with reference to FIG. 3, the description of the double gaseous diffusion electrode A, there will now be described, with reference essentially to FIG. 2, the replaceable anode-electrolyte (dry) B assembly. This assembly, which is U-shaped, is arranged in the electrochemical generator (FIG. 1) around the double electrode A. The assembly B comprises two symmetrical branches Ba and Bb, these two branches being identical. Each branch Ba and Bb comprises two compartments, namely a first compartment G for the anode or negative electrode and a second compartment H intended for a layer of dry electrolyte. Compartments G and H are obtained, in the embodiment illustrated from plastics material, for example from polyvinyl chloride, formed in vacuum, the edges of the compartments or tanks thus formed being welded between themselves, for example by high frequency.

The first compartment G, which is situated opposite and on the side of the double gaseous diffusion electrode A, comprises, in the embodiment illustrated, several layers of separator 8 of mercerized paper and of regenerated cellulose film, whilst the anodic material proper 8a is constituted by several layers of amalgamated expanded zinc and if necessary a sheet of paper 8b.

The second compartment H comprises the electrolyte in the dry state, constituted, in the embodiment illustrated, by a homogeneous plate 10 of hydrated potassium hydroxide, such a plate being described in the French patent application filed concurrently by applicant for "New electrode for a primable electrochemical generator, method for the production of such an electrode and an electrochemical generator comprising at least one such electrode." This plate has advantageously a composition comprised between that of the monohydrate $KOH,H_2O$ and that of the eutectic $KOH,-H_2O + KOH\alpha$.

To avoid any direct contact between the anodic material of the first compartment G and the dry electrolyte (plate 10) of the second compartment H, there is arranged between these two compartments a sheet 10a of plastics material of the same nature as that of the tanks. The first compartment is open over almost the whole of its front surface 11a, whilst the second compartment has an opening on its rear surface 11b.

Each anode or negative electrode is connected to a current collector 13 and the two collectors 13 end at a common nickel terminal 14. The anode is hence also double.

It is to be borne in mind, in studying the drawings, that it is easy to modify, as a function of height, the thickness of the anodic material and of the electrolyte plate, if this is considered useful. This can be quite advantageous for the anodic material to the extent that it is used more rapidly in the upper portion which is facing the surface of the positive electrode for which the gaseous diffusion is best. This modification enables, on the other hand, the layer of dry electrolyte to be given the shape most adapted for reducing the overall bulk of the electrochemical generator.

In the foregoing, it has been indicated that the anodic material was advantageously constituted by an amalgamated expanded zinc and the dry electrolyte by hydrated potassium hydroxide, but of course other constituents could be provided or other forms of the zinc or of the potassium hydroxide. It could also be provided that the two compartments G and H be united into a single one in which the anodic material and the dry electrolyte would be intimately mixed; this would be the case for example if there were used a dehydrated electrode of the type described in French patent application filed by applicant Dec. 10, 1970 under the number 70.44579 for "New electrode for a primable electrochemical generator, method for its production and an electrochemical generator comprising such an electrode."

Having described above the structure of the assembly of the electrochemical generator, besides that of the closure assembly F, it can now be explained how the assembly of these various constituents of the generator is effected and the structure of the assembly F described.

The anode-electrolyte (dry) assembly B is arranged around the gaseous diffusion double electrode A, these two constituents A and B essential from the electrochemical point of view, occupying the lower portion of the container 1. It is advantageous to allow a free space below the assembly B in the bottom of the container 1. The common terminal 14 (constituting a female terminal) is connected to a male terminal 15 of nickeled metal.

The upper portion of the gaseous diffusion double electrode A is housed and encased in an electrode support C. At the level of this support and over the whole periphery, the parts A and C are assembled by gluing, so as to render them mechanically fast and to ensure perfect fluid-tightness at the level of their connection.

The support of electrode C comprises also an orifice in which is arranged, with clamping, the male terminal of nickeled metal 15. This terminal 15 is connected electrically through a conductor wire 16 to a central terminal 17 which is constituted by a six-sided screw in the embodiment illustrated. This screw-shaped terminal is placed, with clamping, in a housing situated in the center of the part D constituting a seal carrier. The latter is encased in the upper opening of the electrode support C to which it is made quite fast by gluing. The seal carrier D and the electrode support C are formed for example of plastics material, especially of polystyrene.

Around the seal carrier D, there is advantageously arranged a flexible frame 18, for example of rubber or of another elastomer, this frame constituting a flexible gasket intended to ensure the fluid-tightness of the generator on final assembly. Above the seal carrier D is arranged a cover E which becomes supported on the flexible gasket 18. The outer section of the cover E is equal to the internal section of the container 1. The seal-carrier D and the cover E each comprise two orifices $21_D$ and $22_D$ for one and $21_E$ and $22_E$ for the other, the two orifices $21_D$ and $21_E$ on one hand, and two orifices $22_D$ $22_E$, on the other hand, being in extension of one another, so as to permit the access of air to the aerator 4.

A locking nut 19 is screwed on the screw terminal 17, which, by means of the cover E, effects the squeezing of the flexible gasket 18 and thus ensures very efficient sealing. The nut 19 is advantageously milled and it comprises orifices 20 capable of receiving connectors (similar to the connector 5a) ensuring the electrical connections.

Having thus completed the description of the various constituents of the generator by that of the closure device F, it will now be described how the latter is operated.

On first starting up the generator, the latter only comprises the gaseous diffusion double electrode A and the closure and connecting means without containing the removable anode-electrolyte (dry) assembly B.

The milled nut 19 is first unscrewed whilst leaving it on the screwed terminal 17. This nut is pulled to withdraw the whole assembly (upper closure system F and gaseous diffusion double electrode A) from the container 1.

There is then introduced into the container 1, which is empty, water up to a level marked in advance on the container (for example by an engraved line). There is removed from a sealed protective envelope (in which it is delivered) an anode-electrolyte (dry) assembly B and this assembly is arranged around the gaseous diffusion double electrode A whilst ensuring electrical connection between the terminals 14 and 15.

The whole assembly is then introduced into the container 1, then the milled nut 19 is screwed so as to ensure the fluid-tightness of the generator by compressing the flexible gasket 18. Very rapidly the dry electrolyte of the assembly B is dissolved and the generator is ready to operate. In the course of this operation reaction products can be formed and they will have a tendency to be deposited in the space which has been left free, in the preferred embodiment, at the bottom of container 1 (see FIG. 1).

When the generator no longer operates, due to the exhaustion of the negative electrode and/or of the electrolyte after a discharging cycle, the milled nut 19 is unscrewed and all of the constituents of the container 1 are withdrawn. The liquid contained in the latter is drained and the container is washed with water. The active outer portion of the gaseous diffusion double electrode A is also washed with water, whilst the anode-electrolyte (dry) assembly B, which is exhausted, is discarded. It then suffices, after having poured water up to the reference level, to reintroduce into the container 1 the gaseous diffusion double electrode A assembly which has just been cleaned and a new anode-electrode (dry) assembly B (previously extracted from its sealed protective envelope), as well as the upper closure assembly, as indicated for the first time of placing in operation. The generator is then again ready to operate.

In the drawings, there is illustrated a single generator having for a pole or positive terminal the connector 5a of the current collector 5 and for the negative pole or terminal the milled nut 19. It is obvious that several generators of this type could be arranged in series by connecting the connector 5a from one element in hole 20 of the milled nut 19 of another element. There can thus be constructed a generator adapted to deliver a larger or smaller voltage. In a modification, there could be arranged a series generators of the type illustrated in FIG. 1 in a common container. It could be provided in this case that each lateral surface of one container is common to two neighbouring generators, so as to reduce the bulk.

Up to the present the case of an air-zinc generator has been considered with a hydrate of potassium hydroxide soluble in water for an electrolyte. It is of course understood that the invention could also be applied to electrochemical generators with an air electrode of another type such as air-magnesium generators having sodium chloride soluble in water for the electrolyte.

It is known, on the other hand, that there exist at present electrically rechargeable zinc-air generators. A generator constructed according to the invention could also be rechargeable electrically; there would then be the advantage of the characteristic of being at same time electrically and mechanically rechargeable.

Whatever the embodiment, an additional advantage is to be found in the invention when the latter is applied to a generator formed of several elements in series, which additional advantage resides in the fact that when one of these elements comprises a defective gaseous diffusion electrode, the latter can be replaced; such a replacement enables a substantial economy with respect to products already known which require in such circumstances replacement of the whole generator.

In any case, and according to the description which has been provided of the material and of the conditions for placing it in operation, it will also be understood that a gaseous diffusion electrode having an accidental sealing fault would not be a reason for stopping the operation of the generator. In fact, in this case the electrolyte will fill in part the inside of the pocket of the gas diffusion electrode, but there will remain a non-negligible active surface capable of operating normally.

As is self-evident and as emerges already from the foregoing, the invention is in no way limited to those of its types of application, nor to those of the embodiments of its various parts, which have been more especially considered; it encompasses, on the contrary, all modifications.

We claim:
1. An electrochemical generator comprising:
   a container;
   an obturator assembly comprising a flexible gasket means for sealing engagement with, and means for effecting said sealing engagement with said container;
   a prismatic aerator mounted to said obturator assembly;
   a pair of cathode electrodes secured to the sides of said aerator;
   a U-shaped anode support member;
   a pair of electrode assemblies mounted on said U-shaped support member, said electrode assemblies being spatially arranged on said U-shaped member in parallel relationship with said cathode electrodes, each of said electrode assemblies having a first and second compartment, said first compartment including at least one separator layer and at least one layer of amalgamated expanded zinc, said second compartment including a homogeneous plate of hydrated potassium hydroxide; and means for electrical connection of each of said cathode electrodes and each of said electrode assemblies.

2. Electrochemical generator according to claim 1, wherein said cathode electrodes are sheet electrodes constituted essentially by a porous hydrophobic polytetrafluorethylene-based layer, by a conductive grid of nickel or of nickel steel, and by an active layer formed from a mixture of activated carbon powder and polytetrafluorethylene.

3. Electrochemical generator according to claim 1, wherein the obturator assembly comprises an electrode support, a seal carrier which is seated in an opening provided in said electrode support, means provided for making fast the electrode support and the seal carrier, a sealing joint arranged between said electrode support and said seal carrier, the assembly of the three latter elements being traversed by a screw terminal whose head is rigidly fixed to said electrode support, and a nut which is screwed on the threaded end of said screw terminal whereby the sealing means are squeezed outwardly to effect sealing engagement between the container and said assembly.

* * * * *